Patented June 23, 1931

1,811,777

UNITED STATES PATENT OFFICE

JOHN WILLIAM BLAGDEN, OF LONDON, ENGLAND, ASSIGNOR OF ONE-HALF TO HOWARDS & SONS LIMITED, ILFORD, ENGLAND

PROCESS FOR MAKING SYNTHETIC MENTHOL

No Drawing. Original application filed June 19, 1924, Serial No. 721,137, and in Great Britain May 21, 1924. Divided and this application filed December 16, 1925. Serial No. 75,866.

In my United States application Serial No. 721,137, filed June 19, 1924, of which this application is a division, I have described the manufacture of crystalline menthol from cyclic ketones which yield on hydroganation a mixture of crystalline menthol and a normally liquid product, for example from menthone.

By the process of the aforesaid application the yield of crystalline menthol obtainable by the hydrogenation is improved by agitating the product of the hydrogenation of the ketone in presence of hydrogen and a catalyst, at a raised temperature, preferably at 110–120° C. whereby a portion of the normally liquid product becomes converted into the normally crystalline menthol. According to a modification of said process, the normally liquid product may be separated from the crystalline menthol which accompanies it in the product of hydrogenation, and may be agitated at a raised temperature in presence of hydrogen and a catalyst, a portion of the liquid product being converted into the normally crystalline product. The process may be applied to the hydrogenation of successive batches of the ketone by separating the normally liquid product from the mixture produced by the hydrogenation of one batch, and mixing the separated liquid product with a further batch of the ketone before this batch is hydrogenated, and so on with each batch.

The present invention relates to a modification of that described in my said application for Letters Patent.

According to the present invention the process described in the said specification is applied to piperitone.

I have found that this compound also yields on hydrogenation, a mixture which consists substantially of a substance which is a crystalline solid at ordinary temperature and a substance which has a much lower melting point and is normally a liquid. The solid body is an optically inactive menthol and the liquid is apparently an isomer thereof.

When piperitone is treated with hydrogen in presence of a hydrogenation catalyst a condition is soon attained when the compound ceases to absorb hydrogen. The product is then, as stated above, a mixture which on cooling may deposit some of the crystalline solid, the rest remaining liquid at ordinary temperature. In the product therefore these two forms have a certain proportion to each other when absorption of hydrogen ceases, the solid product being of course in the molten condition.

I have discovered that this proportion can be changed by agitating the mixture in an atmosphere of hydrogen or containing hydrogen and in presence of a suitable catalyst, and a new proportion set up, with the result that a much larger proportion of crystals can be obtained on cooling than if the product of hydrogeneration has been cooled directly. Among suitable catalysts are those consisting of or containing nickel or cobalt or nickel and copper.

By taking advatnage of this discovery I am able to obtain from the parent compound the crystalline body in enhanced yield, and in one procedure, as practically the only product.

The object can be attained by agitating the normally liquid product in the presence of the still molten solid product in an atmosphere of hydrogen or containing hydrogen and in presence of a suitable catalyst. Thus, if when the parent compound ceases to absorb hydrogen, the mixture is brought to a temperature of about 110°–120° C. and is then agitated in an atmosphere containing hydrogen in presence of a catalyst and subsequently cooled, a larger proportion of crystalline solid separates than would have been the case had the cooling occurred when the first treatment with hydrogen was at an end.

Another procedure consists in separating the crystals from the liquid after the mixture produced at the end of the hydrogenation has cooled and then mixing this liquid with the parent compound and hydrogenating this mixture in the known manner. The parent compound in the mixture is hydrogenated and the agitation of the normally liquid body in presence of the hydrogen and catalyst produces a quantity of the crystalline form. It follows that when the mixture is again cooled the proportion of crystals produced to the parent compound used is greater than it would have been had the parent compound alone been hydrogenated.

This latter procedure leads to a process by which the parent compound is hydrogenated in successive batches, the normally liquid product from the first batch being mixed with the second batch of parent compound before this is hydrogenated and the normally liquid product from this batch being mixed with the third batch of parent compound before it is hydrogenated, and so on, so that ultimately there remains only so much of the normally liquid product as was present after hydrogenating the first batch.

I have further found that if the liquid constituent be agitated alone at a raised temperature, preferably about 110°–120° C., in an atmosphere of hydrogen or containing hydrogen and in presence of the suitable catalyst, a portion of it becomes converted into the crystalline solid product. Thus, it may be advantageous to heat the normally liquid portion of the product from any of the batches referred to above and to agitate it in an atmosphere of hydrogen or containing hydrogen and in presence of the catalyst, and subsequently to cool the product of this agitation to separate the portion of crystals before the normally liquid product is mixed with the parent compound for the further hydrogenation.

The formation of menthol by hydrogenation of piperitone may be assumed to proceed in accordance with the equation—

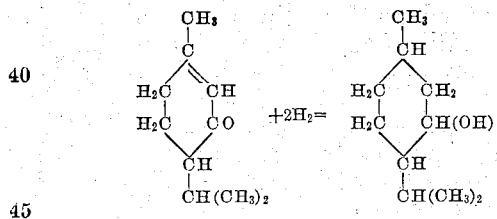

The invention is illustrated by the following examples:—

*Example 1*.—150 lbs. of piperitone are melted and mixed with 2 lbs. of nickel catalyst made by reducing a nickel compound in known manner. The mixture is stirred in known manner in an autoclave with hydrogen, at 30–70 lbs. per sq. in. pressure and at an average temperature of 130°–160° C., until the absorption of hydrogen ceases. The hot liquid is separated from the catalyst and cooled slowly to about 10° C. The crystals which separate (amounting to about 30 per cent. of the parent compound treated) are removed from the liquid and the latter is mixed with a weight of piperitone equal to that of the crystals removed; this mixture is hydrogenated and treated in the manner described above (with production of crystals amounting to about 100 per cent. of the piperitone in the mixture hydrogenated). The liquid portion ultimately obtained being mixed with another portion of piperitone and so on.

*Example 2*.—After the first, or indeed after any of the hydrogenations described in Example 1, the mixture in the autoclave is cooled or allowed to cool to between 110° C. and 120° C., and thoroughly stirred at this temperature for several hours without further passage of hydrogen; cooling, separation of the crystals and mixing the liquid with more piperitone for another hydrogenation then follows as described in Example 1. The proportion of crystals thus obtained is considerably greater than in Example 1.

*Example 3*.—100 lbs. of the normally liquid product from the hydrogenation of piperitone are mixed with a nickel catalyst and the mixture is heated to 120° C. in an atmosphere of hydrogen. While the temperature is maintained the mixture is stirred vigorously for several hours. On cooling to 10° C. crystals amounting to some 50 per cent. of the weight of the original liquid are produced.

Having thus fully described the nature of the said invention and the best means I know of carrying the same into practical effect, I claim:—

1. A process of making crystalline menthol, which comprises treating piperitone with hydrogen under pressure in presence of a hydrogenating catalyst at a temperature between 130° C. and 160° C. until there has been absorbed a quantity of hydrogen substantially in excess of that theoretically required to convert the piperitone into menthone.

2. A process of making crystalline menthol, which comprises treating piperitone with hydrogen under pressure in presence of a hydrogenating catalyst at a temperature between 130° C. and 160° C. until there has been absorbed a quantity of hydrogen substantially in excess of that theoretically required to convert the piperitone into menthone, cooling the hydrogenated product and separating the crystals.

3. In the catalytic hydrogenation of piperitone, the improvement which consists in conducting the hydrogenation under pressure at a temperature between 130° and 160° C. and continuing the hydrogenation until there has been absorbed a quantity of hydrogen substantially in excess of that theoretically required to convert the piperitone into menthone, then cooling the hydrogenated product to about 10° C. and separating the crystals.

4. A process of making crystalline menthol, which comprises treating piperitone with hydrogen under pressure in presence of a hydrogenating catalyst at a temperature between 130° C. and 160° C. until there has been absorbed a quantity of hydrogen substantially in excess of that theoretically required to convert the piperitone into menthone, cooling the hydrogenated product to about 10° C. and separating the crystals.

5. In a process of making crystalline menthol by catalytic hydrogenation of piperitone, the step which consists in adding to the piperitone to be hydrogenated a quantity of the normally liquid constituent of the hydrogenated piperitone.

6. In the process of making crystalline menthol by catalytic hydrogenation of piperitone, the step which consists in agitating, in the presence of a nickel catalyst and hydrogen, the normally liquid constituent of the product of hydrogenation of piperitone at a temperature below the normal boiling point of said constituent and not lower than 110° C.

7. In the process of making crystalline menthol by catalytic hydrogenation of piperitone, the step which consists in agitating, at a temperature between 110° and 120° C. and in the presence of a nickel catalyst and hydrogen, the normally liquid constituent of the product of hydrogenation of piperitone.

8. In the process of making crystalline menthol by catalytic hydrogenation of piperitone, the step which consists in agitating, in the presence of hydrogen and a nickel catalyst at a temperature between 110° and 120° C., the mixture constituting the product of hydrogenation of piperitone.

9. In the process of making crystalline menthol by catalytic hydrogenation of piperitone, the step which consists in agitating, in the presence of hydrogen and a nickel catalyst, the mixture constituting the product of hydrogenation of piperitone at a temperature below the normal boiling point of said mixture and not lower than 110° C.

10. In the process of making crystalline menthol by catalytic hydrogenation of piperitone, the step which consists in agitating, in the presence of a hydrogenating catalyst and hydrogen, the normally liquid consituent of the product of hydrogenation of piperitone at a temperature below the normal boiling point of said constituent and not lower than 110° C.

11. In the process of making crystalline menthol by catalytic hydrogenatin of piperitone, the step which consists in agitating, at a temperature between 110° and 120° C. and in the presence of a hydrogenating catalyst and hydrogen, the normally liquid constituent of the product of hydrogenation of piperitone.

12. In the process of making crystalline menthol by catalytic hydrogenation of piperitone, the step which consists in agitating, in the presence of hydrogen and a hydrogenating catalyst at a temperature between 110° and 120° C., the mixture constituting the product of hydrogenation of piperitone.

13. In the process of making crystalline menthol by catalytic hydrogenation of piperitone, the step which consists in agitating, the mixture constituting the product of hydrogenation of piperitone at a temperature below the normal boiling point of the said mixture and not lower than 110° C. and in the presence of hydrogen and a hydrogenating catalyst.

14. In a process of making crystalline menthol by catalytic hydrogenation of piperitone whilst heating, the step which consists in cooling the product to about 10° C., separating the crystals from the liquid, and adding the latter to a further quantity of piperitone to be hydrogenated, of weight equal to that of the crystals removed.

In testimony whereof I have signed my name to this specification.

JOHN WILLIAM BLAGDEN.